(12) United States Patent
Gleason et al.

(10) Patent No.: US 9,845,142 B2
(45) Date of Patent: Dec. 19, 2017

(54) CONDUCTIVE THERMOPLASTIC GROUND PLANE FOR USE IN AN AIRCRAFT

(71) Applicant: The Boeing Company, Seal Beach, CA (US)

(72) Inventors: Michael P. Gleason, Edwardsville, IL (US); Mathew Albert Coffman, St. Charles, MO (US); David G. Betterly, St. Charles, MO (US); Michael A. Arrowsmith, Pocahontas, IL (US); John M. Robertson, Florissant, MO (US); Anthony Michael Hoff, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 698 days.

(21) Appl. No.: 14/460,908

(22) Filed: Aug. 15, 2014

(65) Prior Publication Data
US 2016/0257394 A1    Sep. 8, 2016

(51) Int. Cl.
*B64C 1/12* (2006.01)
*B29C 70/88* (2006.01)
(Continued)

(52) U.S. Cl.
CPC .............. *B64C 1/12* (2013.01); *B29C 70/882* (2013.01); *B29D 99/001* (2013.01); *B32B 5/024* (2013.01); *B32B 7/12* (2013.01); *B32B 27/08* (2013.01); *B32B 27/12* (2013.01); *B32B 27/20* (2013.01); *B64D 45/02* (2013.01); *B29K 2021/003* (2013.01); *B29K 2105/16* (2013.01); *B29K 2507/04* (2013.01); *B29K 2995/0005* (2013.01); *B29L 2031/3076* (2013.01); *B32B 2260/021* (2013.01); *B32B 2260/046* (2013.01); *B32B 2262/0261* (2013.01); *B32B 2262/101* (2013.01); *B32B 2262/106* (2013.01); *B32B 2274/00* (2013.01); *B32B 2307/202* (2013.01); *B32B 2307/212* (2013.01);
(Continued)

(58) Field of Classification Search
CPC ..... B29C 70/882; B64C 1/12; B32B 2274/00; B32B 27/08; B32B 27/12; B32B 27/20; B64D 45/02
See application file for complete search history.

(56) References Cited

U.S. PATENT DOCUMENTS 5,401,901 A * 3/1995 Gerry ..................... B32B 7/02
                                                          174/391
6,337,294 B1    1/2002 Waldrop, III
(Continued)

FOREIGN PATENT DOCUMENTS

| WO | 03/028039 A1 | 4/2003 |
|---|---|---|
| WO | 2004/083292 A1 | 9/2004 |
| WO | 2014011293 A2 | 1/2014 |

OTHER PUBLICATIONS

European Extended Search Report, Application No. 15181281.5, dated Jan. 26, 2016, pp. 8.
(Continued)

Primary Examiner — Justin M Benedik
(74) Attorney, Agent, or Firm — Armstrong Teasdale LLP

(57) ABSTRACT

An aircraft skin panel includes a laminated composite layer and a ground plane coupled to the composite layer, wherein the ground plane is an electrically conductive elastic thermoplastic.

20 Claims, 6 Drawing Sheets

(51) Int. Cl.
*B29D 99/00* (2010.01)
*B64D 45/02* (2006.01)
*B32B 5/02* (2006.01)
*B32B 7/12* (2006.01)
*B32B 27/08* (2006.01)
*B32B 27/12* (2006.01)
*B32B 27/20* (2006.01)
*B29L 31/30* (2006.01)
*B64C 1/00* (2006.01)
*B29K 21/00* (2006.01)
*B29K 105/16* (2006.01)
*B29K 507/04* (2006.01)

(52) U.S. Cl.
CPC ....... *B32B 2307/51* (2013.01); *B32B 2605/18* (2013.01); *B64C 2001/0072* (2013.01); *Y02T 50/433* (2013.01)

(56) References Cited

U.S. PATENT DOCUMENTS

| | | | |
|---|---|---|---|
| 6,399,737 B1 | 6/2002 | Elkovitch | |
| 7,901,595 B2 | 3/2011 | Vilkman et al. | |
| 8,427,380 B2 | 4/2013 | Farrell et al. | |
| 2004/0026100 A1 | 2/2004 | Mattson et al. | |
| 2008/0128553 A1* | 6/2008 | Brown | B64C 1/26 244/124 |
| 2008/0166563 A1* | 7/2008 | Brittingham | C08J 3/18 428/411.1 |
| 2008/0248278 A1* | 10/2008 | Fisher | B32B 5/02 428/304.4 |
| 2011/0142091 A1* | 6/2011 | Wardle | B82Y 15/00 374/45 |
| 2011/0287246 A1* | 11/2011 | Arai | C08J 5/24 428/300.1 |
| 2013/0071626 A1* | 3/2013 | Simmons | B32B 5/28 428/172 |
| 2013/0309396 A1 | 11/2013 | Legare | |
| 2015/0050450 A1 | 2/2015 | Beraud et al. | |

OTHER PUBLICATIONS

Walter, Michaeli, et al., "Electrically Conductive Thermoplastic/ Metal Hybrid Materials for Direct Manufacturing of Electronic Components."

* cited by examiner

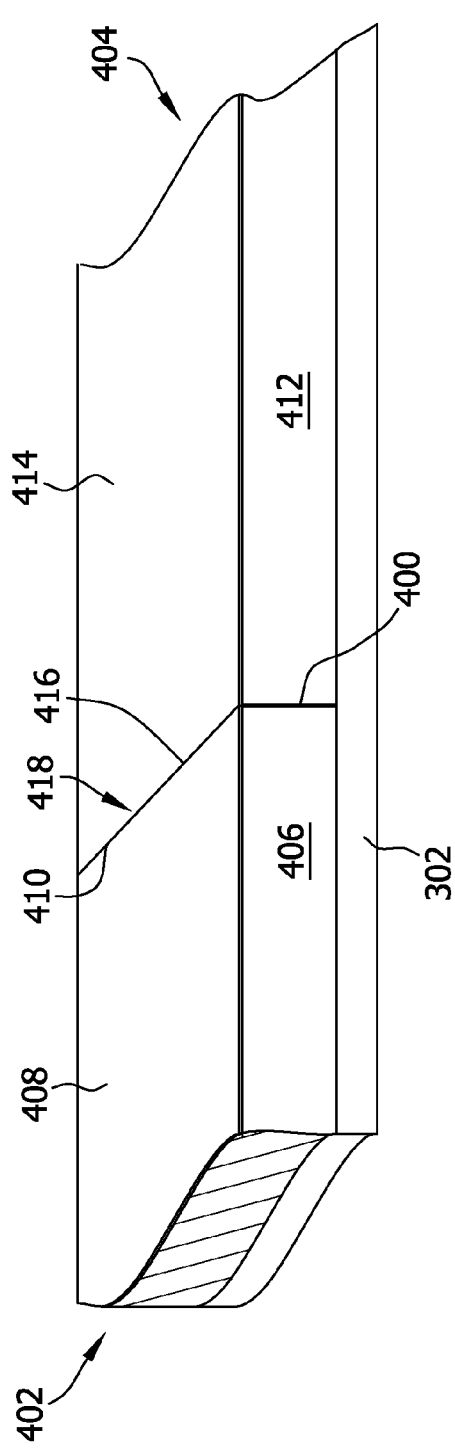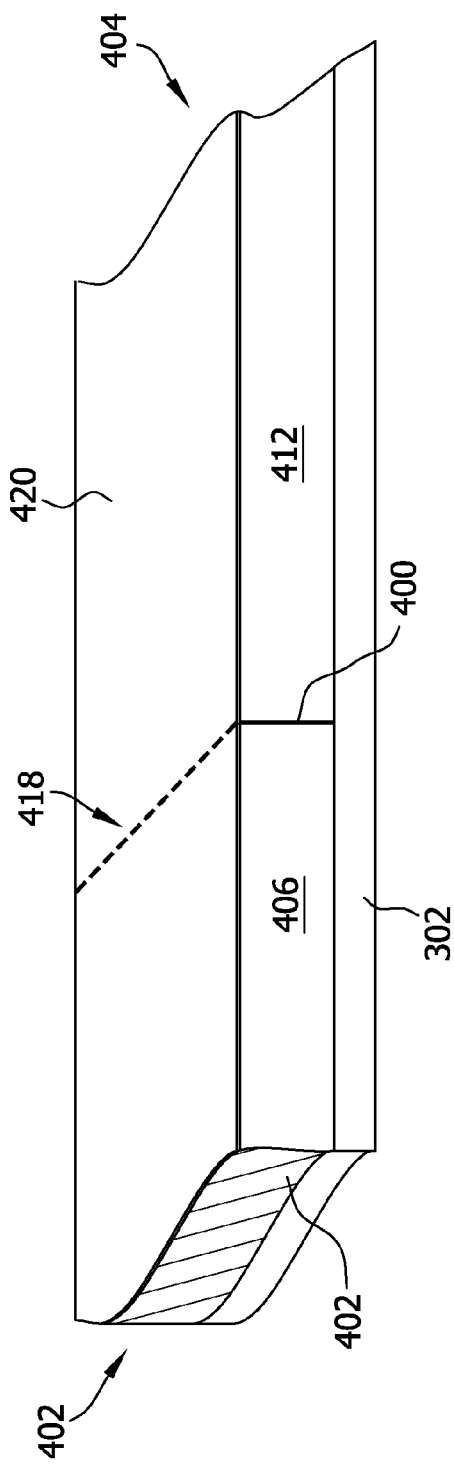

CONDUCTIVE THERMOPLASTIC GROUND PLANE FOR USE IN AN AIRCRAFT

BACKGROUND

The present invention relates to ground planes for use on an interior or exterior of metallic or composite cured aircraft skins and methods of forming the same, and more particularly, to a conductive thermoplastic ground plane that facilitates electrical continuity and flexibility.

A ground plane is an electrically conductive surface that serves as part of an antenna to reflect radio waves from other antenna elements. The ground plane may function as lightening protection, and/or shield to protect electronic equipment, particularly sensitive electronic equipment such as computers, and communications equipment against electromagnetic interference. In the aircraft industry, electromagnetic interference may cause aircraft instruments to malfunction and can result in navigational errors and even the loss of the aircraft. In the past, the metal skin of the aircraft served as the ground plane. However, at least some known aircraft use composite laminates as the skin material to reduce weight. In such cases, the laminate skin itself is no longer electrically conductive and a conductive ground plane may need to be integrated therein.

At least some known ground planes for use in an aircraft composite skin include embedded structural materials within the composite, such as non-woven fiber mats, which may be heavy and brittle. Additionally, the fiber mats may cause electrical discontinuity at the manufacturing joint between adjacent composite panels. Another known method of introducing a conductive ground plane to nonconductive composite skin is to apply a sprayed-on conductive material, such as a paint, to the surface of the skin. However, such paints are prone to damage and chipping and lose their continuous electrical conductivity where such damage occurs.

Furthermore, when openings are drilled through the composite skin to accommodate fasteners, both embedded structural materials and sprayed-on materials lose their continuous electrical conductivity where the openings are drilled. Also, in cases where the ground plane also serves as lightning protection for the aircraft, the aircraft is no longer lightning protected at the locations of the fasteners. Moreover, neither embedded structural materials nor sprayed-on materials are able to flex and elongate along with the composite skin and return to its static structural position without incurring fatigue damage.

Thus there exists a need for a material that can easily and significantly stretch in all directions, is highly conductive in all states of flexure, can withstand repeated elongations with no degradation in shielding effectiveness or material properties, is thin and light weight, and which is tough enough to withstand severe aerospace environments, such as are encountered when the aircraft is operating within cold environments, at high altitudes, and/or other flight conditions.

BRIEF DESCRIPTION

In one aspect, an aircraft skin panel is provided. The skin panel includes a laminated composite layer and a ground plane coupled to the composite layer, wherein the ground plane is an electrically conductive elastic thermoplastic.

In another aspect, an aircraft is provided. The aircraft includes a deformable structure, a plurality of skin panels coupled to the deformable structure, and a ground plane coupled to at least one of the skin panels, wherein the ground plane is an electrically conductive elastic thermoplastic.

In yet another aspect, a method of manufacturing an aircraft skin panel is provided. The method includes forming a laminated composite layer and forming a ground plane from an electrically conductive elastic thermoplastic. The electrically conductive elastic thermoplastic ground plane is then coupled to the composite layer.

BRIEF DESCRIPTION OF THE DRAWINGS

FIGS. 7A and 7B are perspective cross-sectional views of a manufacturing joint between adjacent aircraft skin panels shown in FIGS. 4 and 5 illustrating a splicing method.

DETAILED DESCRIPTION

The implementations described herein relate to a plurality of composite skin panels for use for use with an aircraft. More specifically, the aircraft includes a deformable structure, such as the wings or the empennage, and a plurality of skin panels coupled to the deformable structure. In various embodiments, the skin panels may be fabricated from a metallic material, such as aluminum, a composite material, or a combination of metallic and composite materials. In the illustrated embodiment, each skin panel includes at least a laminated composite layer and a ground plane coupled to the composite layer, wherein the ground plane is an electrically conductive elastic thermoplastic. The conductive thermoplastic ground plane is configured to deform in response to a corresponding deformation of the skin panels, fasteners, and structural joints caused by structural loading, flight loads, thermal expansion and contraction, ground handling and other types of aircraft loads which may deform the structure of the aircraft. As such, the ground plane repeatedly accommodates the stresses and strains associated with being coupled to a deformable surface while maintaining its electrical conductivity and without being prone to fatigue damage. In operation, the conductive thermoplastic ground plane minimizes and/or eliminates electrical surface discontinuities such as may be caused by gaps between adjacent skin panels, fasteners, and differences between the conductivities of adjacent skin panels. In some embodiments, the conductive thermoplastic ground plane may be installed over a portion of the aircraft. Optionally, the conductive thermoplastic ground plane may be installed over the entire exterior surface, i.e. the metallic or composite surfaces, of the aircraft to provide a uninterrupted electrically sealed envelope covering the exterior surface of the aircraft. As a result, the conductive thermoplastic ground plane reduces and/or eliminates electrical interference that may occur between various electronic components installed on the aircraft and also functions as a lightning protection device.

Figure 1:
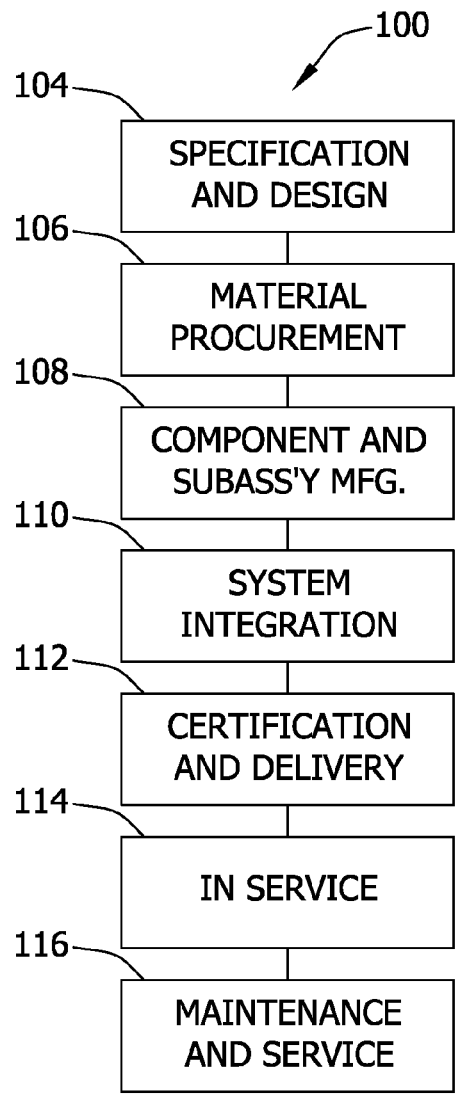
FIG. 1 is a flow diagram of an exemplary aircraft production and service methodology.
Figure 2:
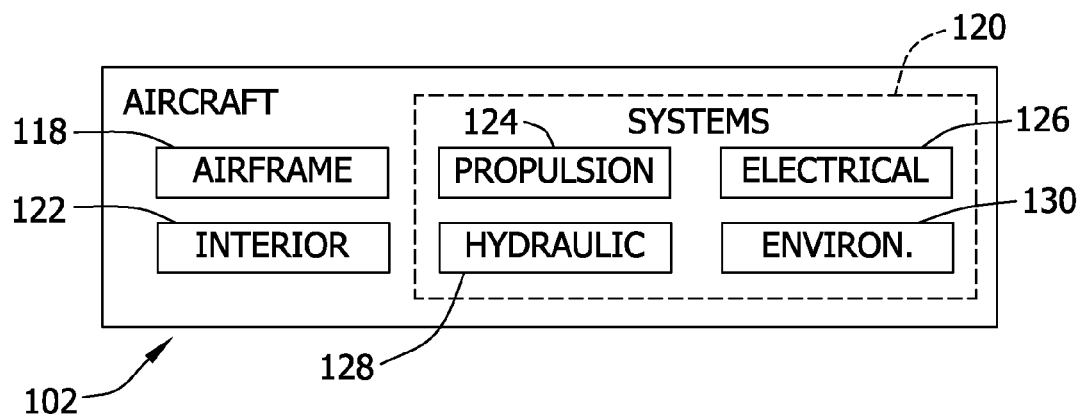
FIG. 2 is a block diagram of an exemplary aircraft.

Referring FIG. 1, implementations of the disclosure may be described in the context of an aircraft manufacturing and service method 100 and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
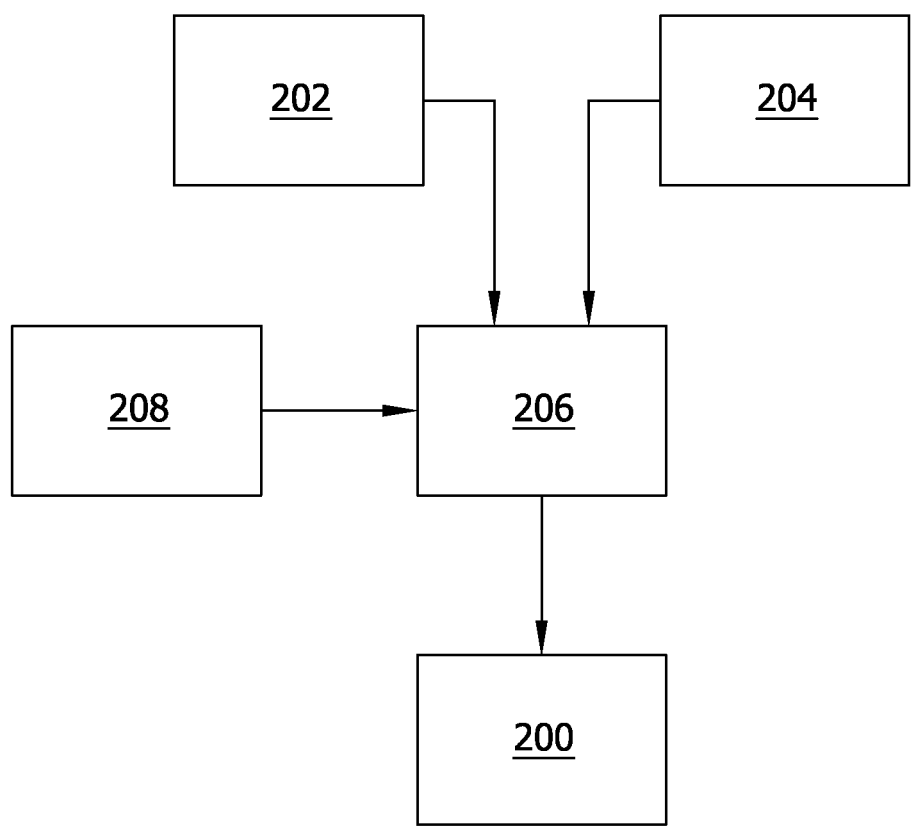
FIG. 3 is a schematic diagram illustrating a method of forming an exemplary conductive thermoplastic ground plane for use with the aircraft described in FIG. 2.

FIG. 3 is a schematic diagram illustrating a method of forming an exemplary conductive thermoplastic 200 that may be used as a ground plane in aircraft 102 (shown in FIG. 2). As described above, it is beneficial for aircraft 102 to include a ground plane that is durable, flexible, and that maintains its electrically conductive continuity. The aircraft may be fabricated from a composite material, a metallic material, or a combination of composite and metallic materials. As such, an electrically conductive thermoplastic ground plane 200 is described herein. These structures possess the properties of very high surface electrical conductivity, radio frequency (RF) reflectivity, and electromagnetic interference shielding, as well as a very high degree of mechanical flexibility. As shown in FIG. 3, conductive thermoplastic 200 is formed by initially mixing a first thermoplastic elastomer 202 with a second thermoplastic elastomer 204 to form an alloyed thermoplastic elastomer 206. The mixing is done by melting first and second thermoplastic elastomers 202 and 204 together at a temperature of approximately 350° F. (177° C.). In the exemplary implementation, first thermoplastic elastomer 202 is Estane 58881 manufactured by The Lubrizol Corporation© of Cleveland, Ohio and second thermoplastic elastomer 204 is Estane 58887 also manufactured by The Lubrizol Corporation© of Cleveland, Ohio. Alternatively, first and second thermoplastic elastomers 202 and 204 may be any known thermoplastic elastomers. In general, the elastomers selected have a relatively low glass transition temperature, Tg. of approximately −40 degrees Fahrenheit and a melt temperature compatible to the fabrication cure temperature of the composite material.

In the exemplary implementation, alloyed thermoplastic elastomer 206 is formed from a substantially equal mixture of first thermoplastic elastomer 202 and second thermoplastic elastomer 204. Alternatively, alloyed thermoplastic elastomer 206 may be formed from any mixture of first and second thermoplastic elastomers 202 and 204. Furthermore, alloyed thermoplastic elastomer 206 may be formed from any combination of any amount of thermoplastic elastomer, and is not limited to only being formed from first and second thermoplastic elastomers 202 and 204. As used herein, the term "elastomer" refers to a material formed from macromolecules and characterized by extensibility and rapid recovery to the original shape after the tension is released.

In order for alloyed thermoplastic elastomer 206 to be electrically conductive, a filler material 208 is mixed with molted alloyed thermoplastic elastomer 206. In the exemplary implementation, filler material 208 includes a plurality of nickel coated graphite flakes distributed throughout alloyed thermoplastic elastomer 206. Alternatively, filler material 208 may be any carbon particle having a metallic coating. Generally, filler material 208 may include any particle that has a conductive coating that facilitates operation of conductive thermoplastic 200 as described herein. As such, electrical conductivity is often achieved by mixing metal or metal-containing particles, such as, but not limited to coated graphite or combinations thereof in a substantially non-electrically conductive thermoplastic polymer acting as a matrix material. In order for conductive thermoplastic 200 to be electrically conductive, particles of filler material 208 mixed therein must either be in contact with each other or the distance between them has to be small enough to allow an efficient current to pass between them.

Once filler material 208 is sufficiently evenly distributed throughout alloyed thermoplastic elastomer 206, the combination is extruded as sheets of conductive thermoplastic 200 to be used as a ground plane in aircraft 102. In one exemplary implementation, each sheet has a thickness between approximately 0.010 inches and 0.020 inches. In the exemplary embodiment, each sheet has a nominal thickness of approximately 0.015 inches. Alternatively, the extruded sheets of conductive thermoplastic 200 may have any desired thickness that facilitates operation of conductive thermoplastic 200 for a desired application. Furthermore, the combination of filler material 208 and alloyed thermoplastic elastomer 206 may be extruded into a mold to facilitate injection molding conductive thermoplastic 200 into a desired shape. As such extruded sheets of conductive thermoplastic 200 are able to be formed into complex shapes or when applied to surfaces having complex curvatures exceeding the drapability of the sheet form by heat forming and/or heat and vacuum forming the conductive thermoplastic 200 to conform to the desired curvature. Once conductive thermoplastic sheet 200 cools, it will retain the desired shape, but also remain flexible and deformable. In other embodiments, conductive thermoplastic sheets may also be laminated with or impregnated into various types of conductive scrims to further enhance the electrical performance in a synergistic fashion. As used herein a scrim is defined as a woven or random fiber mat of conductive materials including woven cloths or plated woven nylon or fiberglass cloths as well as random paper cloths of carbon or plated fiber. More specifically, the conductive thermoplastic sheets function to effectively electrically tie or couple the joints between the scrims whether the scrims are butted together or at least partially overlapping.

At least some known ground planes, such as embedded structures and sprayed-on materials described above, may also include filler material distributed therein. However, the filler material within these materials is randomly oriented therein and therefore requires substantially more filler material than conductive thermoplastic 200 to achieve the level of desired electrical conductivity. The additional filler material may add weight to the ground plane and/or make the ground plane more susceptible to damage. In contrast, at least some the particles of filler material 208 within conductive thermoplastic 200 are substantially aligned in a common orientation. More specifically, at least some the particles of filler material 208 within conductive thermoplastic 200 are substantially aligned in the direction of the flow of conductive thermoplastic 200 as it is being extruded. The pressures that are imparted onto conductive thermoplastic 200 during extrusion are sufficient to substantially align particles of filler material 208 that have an aspect ratio greater than one. As such, the aligning of filler material 208 provides the desired level of electrical conductivity of conductive thermoplastic 200 while using less filler material 208 than known ground planes. Conductive thermoplastic 200 having less filler material 208 facilitates providing a conductive thermoplastic 200 that is lighter and more flexible than known ground planes.

Figure 4:
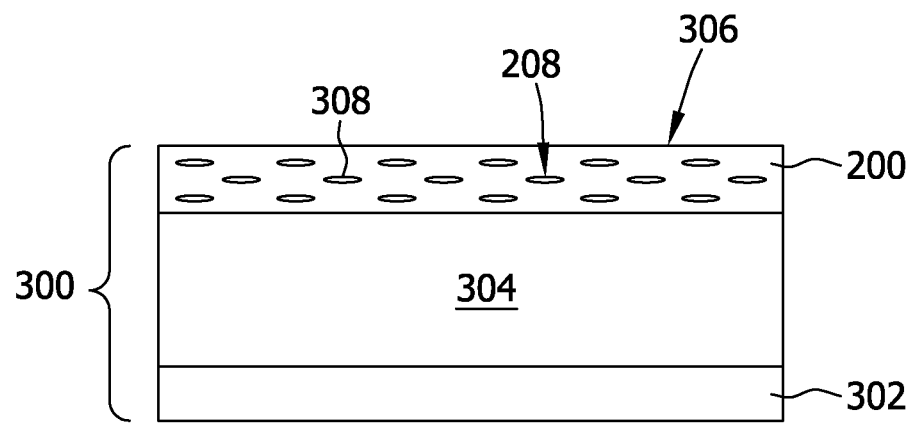
FIG. 4 is a cross-sectional view of an aircraft skin panel coupled a deformable structure of an aircraft, such as the aircraft described in FIG. 2.

FIG. 4 is a cross-sectional view of an aircraft skin panel 300 coupled a portion of a deformable structure 302 of exemplary implementation of a thermoplastic ground plane 306 for use with aircraft 102 (shown in FIG. 2). In the exemplary implementation, deformable structure 302 is a portion of aircraft 102 that is susceptible to flexing or deformation during flight, such as but not limited to, the wing or a portion of the empennage of aircraft 102. In the exemplary implementation, skin panel 300 includes a laminated composite layer 304 and an electrically conductive elastic thermoplastic ground plane 306 such that composite layer 304 is coupled between structure 302 and ground plane 306. Alternatively, ground plane 306 may be coupled to any surface required to be electrically conductive and to provide electromagnetic interference shielding, particularly any surface that tends to flex or elongate during flight. Furthermore, in the exemplary implementation, ground plane 306 serves as an outermost layer of skin panel 300 such that ground plane is exposed to the atmospheric environment during flight of aircraft 102. Alternatively, skin panel 300 may include a layer coupled to the top surface of ground plane 306.

Ground plane 306 includes conductive thermoplastic 200 having a plurality of aligned particles 308 of filler material 208. As described above, in order for ground plane 306 to be electrically conductive, particles 308 within conductive thermoplastic 200 must either be in contact with each other or the distance between them has to be small enough to allow an efficient current to pass between them. Composite layer 304 is formed from multiple plies of fabric and a resin that impregnates the plies. In the exemplary embodiment, composite layer 304 of skin panel 300 is coupled to deformable structure 302, such as the wings or empennage of aircraft 102. Alternatively, composite layer 304 may be coupled to any portion of aircraft 102 that is susceptible to deformations, such as flexing or twisting, during flight.

In the exemplary implementation, ground plane 306, and more specifically, conductive thermoplastic 200, is flexible such that when deformable structure 302, and therefore composite layer 304, flexes or deforms, ground plane 306 is configured to correspondingly deform and then to return to an initial unflexed state without sustaining fatigue damage. As such, ground plane 306 is configured to repeatedly accommodate the stresses and strains associated with being coupled to a deformable surface, that is, composite layer 304, while maintaining its electrical conductivity and without being prone to fatigue damage or significantly increasing the weight of aircraft 102. Furthermore, ground plane 306 is able to maintain its flexibility within a relatively wide operating temperature range of between approximately −60° F. to approximately 300° F. (−51° C. to 149° C.). So despite ground plane 306 being exposed to the cold temperatures encountered during flight, as the outermost layer of skin panel 300, ground plane 306 maintains its flexibility.

In the exemplary implementation, ground plane 306 may be coupled to composite layer 304 using a variety of methods. FIG. 4 illustrates an example of a co-curing method and a post-curing method. In the co-curing method, a sheet of conductive thermoplastic 200 is stacked onto pre-impregnated plies of composite fabric. Both heat and pressure are applied to conductive thermoplastic 200 and the fabric plies to cure the plies and form composite layer 304 having ground plane 306 as the top layer. As such, ground plane 306 and composite layer 304 are at least partially integrated with each other. The co-curing method is ideal for when composite layer 304 is able to be cured at a temperature that is near the melt point of conductive thermoplastic 200 to facilitate integrating conductive thermoplastic 200 into composite layer 304. Moreover, during co-curing, conductive thermoplastic 200 may fill any gaps formed in composite layer 304 and provide additional support structure.

FIG. 4 is also an example of coupling ground plane 306 to composite layer 304 using the post-curing method. In post-curing, composite layer 304 is fully cured before a sheet of conductive thermoplastic 200 is stacked onto cured composite layer 304. After conductive thermoplastic 200 is added, the stack-up including cured composite layer 304 and the sheet of conductive thermoplastic 200 are cured together to form skin panel 300 having composite layer 304 at least partially integrated with ground plane 306. The post-curing method may be used when the temperature and pressure requirements for curing composite layer 304 are outside the transition temperatures of conductive thermoplastic 200. For example, if the melting temperature of conductive thermoplastic 200 is 350° F. (176° F.) and composite layer 304 requires a temperature of 600° F. (315° C.) to properly cure, then it is preferred that composite layer 304 be initially cured and then reheated to closer to 350° F. to prevent conductive thermoplastic 200 liquification. The ground plane 306 may also be used to cover parts installed on the aircraft during any portion of the assembly process. For example, the ground plane 306 may be used to cover fasteners used to join various parts of the aircraft together or for parts installed during a retrofit process. The ground plane 306 also enables a cleaner non-destructive inspection (NDI) of fracture critical parts, without the treatment of or for retrofitting existing parts. The ground plane 306 can therefore be installed at any point in the manufacturing process before or after NDI is performed on the various parts.

Figure 5:
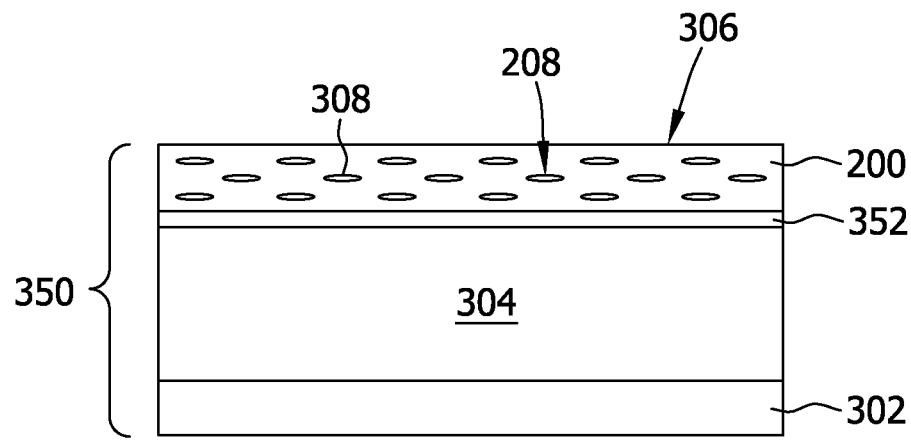
FIG. 5 is a cross-sectional view of another embodiment of an aircraft skin panel coupled to a deformable structure of an aircraft, such as the aircraft described in FIG. 2.
Figure 6:
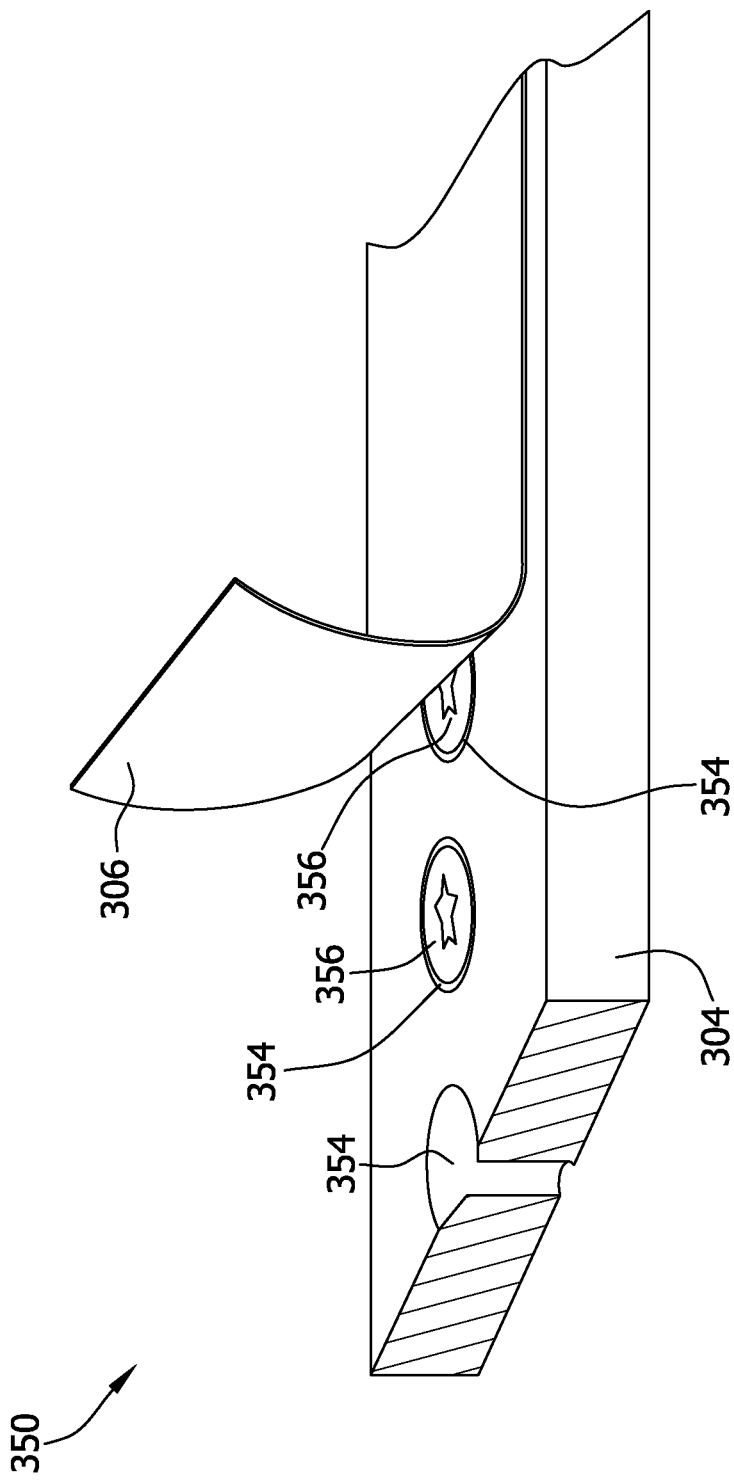
FIG. 6 is a perspective cross-sectional view of the aircraft skin panel shown in FIG. 5 illustrating a portion of a thermoplastic ground plane pulled back.

FIG. 5 is a cross-sectional view of another embodiment of an aircraft skin panel 350 coupled to deformable structure 302 of an aircraft 102 (shown in FIG. 2). Components shown in FIG. 5 that are substantially similar to components shown in FIG. 4 are shown with the same reference numeral. FIG. 5 illustrates a bonding method for coupling ground plane 306 to composite layer 304 of skin panel 350. In the bonding method, a layer of adhesive 352 is coupled between ground plane 306 and composite layer 304. In the exemplary implementation, adhesive 352 is first coupled to conductive thermoplastic 200 and then to composite layer 304. Alternatively, adhesive 352 may be first coupled to composite layer 304 and then conductive thermoplastic 200 coupled thereto. As shown in FIG. 6, the bonding method is ideal for use in cases where composite layer 304 includes openings 354 configured to receive a fastener 310 therein. FIG. 6 illustrates a sheet of conductive thermoplastic 200 that forms ground plane 306 peeled back to reveal openings 354 and fasteners 356. For the sake of clarity, adhesive layer 352 and deformable structure 302 are not shown in FIG. 6. After openings 354 have been formed and fasteners 356 have been inserted therein, adhesive 352 and ground plane 306 are then laid over composite skin 304 to cover openings 354 and fasteners 356. As such, bonding conductive thermoplastic ground plane 306 over openings 354 and fasteners 356 provides for a continuous electrically conductive surface coupled to composite layer 304. In various embodiments, the adhesive includes, for example, a hot melt adhesive, rubber cements, epoxies, and/or solvent bonding agents. Moreover, the bonding method may includes the use of scrims to provide for a control of the thickness of the materials being bonded and to provide an electrical connection between the parts being coupled and an electrical tie to the structure if desired.

As described above, adhesive bonding ground plane 306 to composite layer 304 is ideal in cases where composite layer 304 includes openings 354 and fasteners 356. Whereas, the co-curing and post-curing coupling methods are ideal for use when composite layer 304 does not include openings 354 or fasteners 356, as openings 354 formed therein would cause ground plane 306 to lose electrical conductive continuity. However, openings 354 may be patched over with conductive thermoplastic 200 and spliced together with ground plane 306, as described in further detail below. Regardless of the coupling method, ground plane 306, formed from conductive thermoplastic 200 having filler material 208, remains flexible atop composite layer 304 providing a continuously electrically conductive surface that serves as an electromagnetic interference shield and lighting guard that is able to repeatedly stretch and deform in response to a deformation of composite layer 304 and then return to a non-stretched state.

In the exemplary implementation, ground plane 306 is able to be spliced with an adjacent portion of ground plane 306. In embodiments where ground plane 306 is co-cured or post-cured to composite layer 304, ground plane 306 may be spliced with ground plane 306 of an adjacent panel of composite layer 304 along a manufacturing joint defined between adjacent skin panels. Alternatively, in embodiments where ground plane is bonded to composite skin using adhesive 352 (shown in FIG. 5), the end of a first sheet of conductive thermoplastic ground plane 306 is spliced to the end of an adjacent sheet of ground plane 306. In either case, splicing two adjacent sheets of ground plane 306 together forms a single, continuous electrically conductive surface that does not include joints of seams between sheets of ground plane 306. FIGS. 7A and 7B are perspective cross-sectional views of a manufacturing joint 400 defined between a first skin panel 402 and a second skin panel 404. First and second composite skin panels 402 are adjacent skin panels that are coupled to deformable structure 302 of aircraft 102 (shown in FIG. 2). As shown in FIG. 7A, first panel 402 includes a first composite layer 406 and a first sheet 408 of ground plane 306 that includes a first edge 410. Second panel 404 includes a second composite layer 412 and a second sheet 414 of ground plane 306 that includes a second edge 416. A seam 418 is defined between first and second edges 410 and 416 of first and second sheets 408 and 414.

FIG. 7B illustrates manufacturing joint 400 after splicing and seam 418 is shown in broken line to indicate its elimination. In the exemplary implementation, first and second edges 410 and 416 are spliced together such that seam 418 forms a single continuous sheet 420 of ground plane 306 over both first and second composite layers 106 and 412 of skin panels 402 and 404. In the exemplary embodiment, splicing is implemented using at least one of heat welding, laser welding, ultrasonic welding, and chemical solvent welding. Alternatively, splicing may be implemented using any method that fuses first and second sheets 408 and 414 of ground plane 306 together, such as filled thermoset adhesive having substantially the same conductive filler loading. Therefore, the splicing functions to both physically bind the composite layers together and also to electrically bind or couple the layers together.

Figure 8:
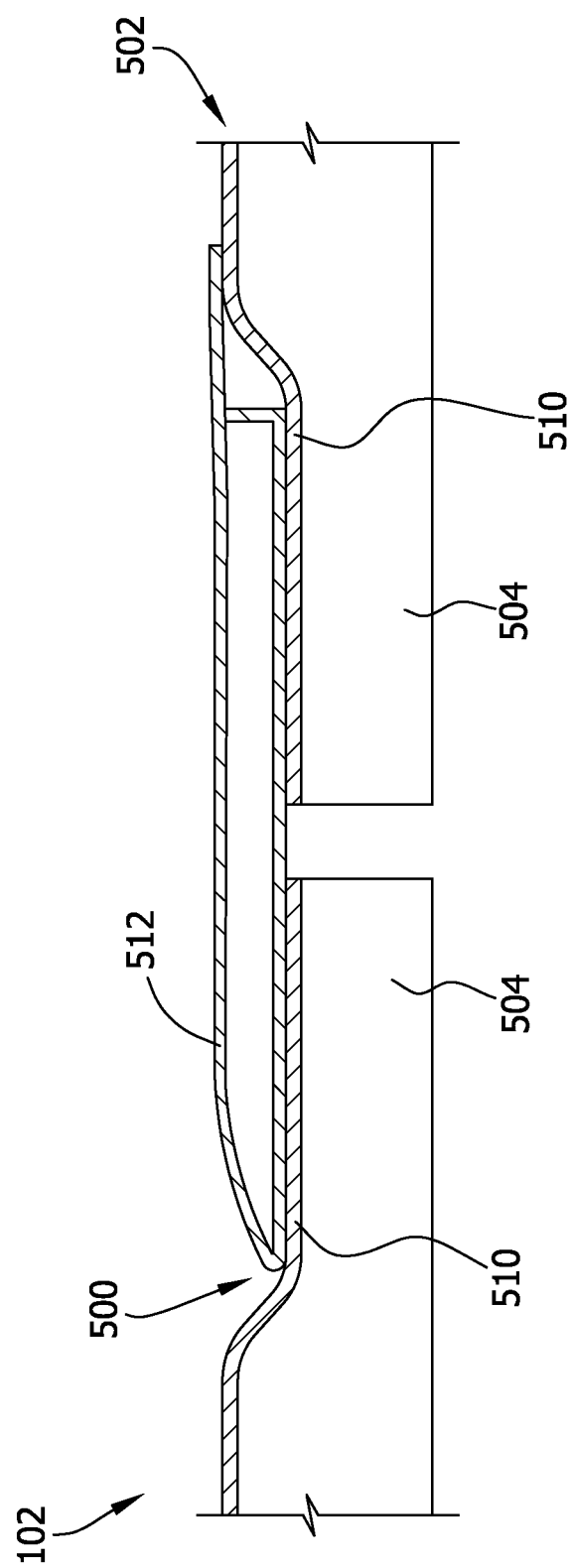
FIG. 8 is a cross-sectional view of another embodiment of a conductive thermoplastic material.

In another embodiment, a seal fabricated from a thermoplastic material 500 may be formed between an aircraft door, such as the aircraft door 502 shown in FIG. 8 and the aircraft skin 504. In operation, the thermoplastic material 500 functions as a seal between the aircraft door 502. The door 502 may be a passenger door that enables passenger to ingress or egress from the aircraft, a door covering the landing gear, a door for accessing the cargo compartment, or any other door or hatch on the aircraft 102.

Additionally, the thermoplastic material 500 functions as a ground plane to electrically couple the door 502 to the aircraft skin 504. In the illustrated embodiment, the thermoplastic material 500 is formed to include two separate ground plane portions. A first ground plane portion 510 is coupled or bonded to a surface 512 of the aircraft skin 504. A second ground plane portion 512 is coupled or bonded to the door 502 such that the portions of the door 502 that are in physical contact with the skin 504 are covered with the ground plane portion 512. The ground plane portions 510 and 512 may be coupled or bonded using any of the methods described above.

In operation, the conductive thermoplastic ground plane 500 minimizes and/or eliminates electrical surface discontinuities such as may be caused by gaps between the door 502 and the skin 504 and therefore reduces and/or eliminates electrical interference that may occur between the door 502 and the skin 504 and also functions as a lightening protection device. It should be clearly seen, that with the thermoplastic material 500 works in conjunction with the thermoplastic material bonded on the other portions of the aircraft to form a substantially continuous electrical ground plane over the exterior of the aircraft.

From the foregoing it will be seen that there has been shown and described an electrically conductive thermoplastic ground plane that provides several advantages over known ground plane technology. The ground plane as described herein is manufactured using a simpler method of mixing at least one thermoplastic elastomer with filler material and forming the mixture into sheets. The manufacturing method aligns the filler material within the elastomer, which enables the use of less filler material for the same level of conductivity as randomly oriented filler material. Less filler material reduces the weight and rigidity of the ground plane. The sheets are then configured to be simply applied to a composite laminate using at least one attachment method: co-curing, post-curing, or adhesive bonding. The ground plane maintains its flexibility when it is coupled to the composite such that the ground plane is able to repeatedly stretch and flex in response to a corresponding deformation of the composite and return to its non-flexed state without sustaining fatigue damage. Moreover, a sheet of the ground plane can be fused with an adjacent sheet or a patch of conductive thermoplastic ground plane such that electrical conductive continuity is maintained along an entirety of the aircraft to provide for optimal electromagnetic interference shielding.

In addition to use as an electromagnetic interference shield, thermoplastic ground plane also serves as lightning protection. The continuous electrical conductivity of thermoplastic ground plane provides a continuous conductive surface over which currents imparted by a lightning strike are dissipated. Thermoplastic ground plane serves as a protective layer between the lightning strike and the non-conductive composite skin. Thermoplastic ground plane provides a continuous conductive surface that covers gaps between composite skin panels and fasteners inserted through the composite skin that would normally allow ingress of electromagnetic radiation. Thus there has been described a conductive thermoplastic ground plane that can easily and significantly stretch in all directions, is highly conductive in all states of flexure, can withstand repeated elongations with no degradation in shielding effectiveness or material properties, is thin and light weight and which is tough enough to withstand severe aircraft environments.

While particular embodiments of the invention have been shown and described with respect to an aircraft having a plurality of skin panels, it will be understood that the invention is not limited thereto since modifications may be made by those skilled in the art, particularly in light of the foregoing teachings. For example, the ground plane described herein may be coupled to an interior or exterior surface of a vehicle, a train, and/or any other assembly. It is therefore contemplated by the following claims to cover any such modifications and incorporate those features which constitute the essential features of these improvements within the spirit and scope of the invention.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft skin panel comprising:
   a laminated composite layer forming a first layer of the aircraft skin panel, wherein said composite layer comprises a plurality of openings defined therein configured to receive a fastener; and
   a ground plane coupled to said composite layer, wherein said ground plane is an electrically conductive elastic thermoplastic that forms a second layer of the aircraft skin panel, said ground plane configured to cover said plurality of openings such that said ground plane forms a continuous electrically conductive surface.

2. The aircraft skin panel in accordance with claim 1, wherein said ground plane is configured to deform to conform with a corresponding deformation of said composite layer.

3. The aircraft skin panel in accordance with claim 1, wherein said ground plane includes a filler material comprising a plurality of particles coated in a conductive material, said plurality of particles being substantially aligned in a common orientation.

4. The aircraft skin panel in accordance with claim 1, wherein said thermoplastic comprises at least one alloyed thermoplastic elastomer.

5. The aircraft skin panel in accordance with claim 1, wherein said ground plane is adhesively bonded to said composite layer.

6. The aircraft skin panel in accordance with claim 1, wherein said ground plane is integrally formed with said composite layer via one of co-curing and post-curing.

7. The aircraft skin panel in accordance with claim 1, wherein said ground plane is configured to provide electromagnetic interference shielding.

8. The aircraft skin panel in accordance with claim 1, wherein said ground plane is an outermost layer exposed to the atmosphere.

9. An aircraft comprising:
   a deformable structure;
   a plurality of skin panels coupled to said deformable structure, wherein said plurality of skin panels comprise a plurality of openings defined therein configured to receive a fastener; and
   a ground plane coupled to at least one of said skin panels, wherein said ground plane is an electrically conductive elastic thermoplastic panel, said ground plane configured to cover said plurality of openings such that said ground plane forms a continuous electrically conductive surface.

10. The aircraft in accordance with claim 9, wherein said ground plane is configured to deform in response to a corresponding deformation of said skin panel caused by a deformation of said deformable structure.

11. The aircraft in accordance with claim 9 further comprising an adhesive coupled between said skin layer and said ground plane.

12. The aircraft in accordance with claim 9, wherein said ground plane is integrally formed with said skin panel via one of co-curing and post-curing.

13. The aircraft in accordance with claim 9, wherein said ground plane is configured to provide electromagnetic interference shielding.

14. The aircraft in accordance with claim 9, wherein said plurality of skin panels comprises a first skin panel including a first ground plane and a second skin panel including a second ground plane, said first skin panel positioned adjacent said second skin panel, wherein said first and said second ground planes are configured to be spliced together to form a single continuous ground plane covering both of said first and said second skin panels.

15. A method of manufacturing an aircraft skin panel, said method comprising:
  forming a plurality of openings in a laminated composite layer of the aircraft skin panel;
  forming a ground plane from an electrically conductive elastic thermoplastic to form a first layer of the aircraft skin panel; and
  coupling the ground plane to the laminated composite layer to cover the plurality of openings such that the ground plane forms a continuous electrically conductive surface, wherein the composite layer forms a second layer of the aircraft skin panel.

16. The method in accordance with claim 15, wherein forming a ground plane further comprises forming a ground plane configured to deform in response to a corresponding deformation of the composite layer.

17. The method in accordance with claim 15, wherein forming a ground plane further comprises forming a ground plane from at least two thermoplastic elastomers.

18. The method in accordance with claim 17, wherein forming a ground plane further comprises mixing the at least two thermoplastic elastomers with a filler material that includes a plurality of particles coated in a conductive material, the plurality of particles being substantially aligned in a common orientation.

19. The method in accordance with claim 15, wherein coupling the ground plane to the composite layer further comprises integrally forming the ground plane with the composite layer via one of co-curing and post-curing.

20. The method in accordance with claim 15, wherein coupling the ground plane to the composite layer further comprises adhesively bonding between the composite layer to the ground plane.

\* \* \* \* \*